Nov. 10, 1942.  J. A. LEWIS  2,301,892
GLASS MACHINE
Original Filed Nov. 5, 1938   2 Sheets-Sheet 1

INVENTOR,
JAMES A. LEWIS.
BY
Lockwood, Goldsmith + Galt,
ATTORNEYS.

Nov. 10, 1942.  J. A. LEWIS  2,301,892
GLASS MACHINE
Original Filed Nov. 5, 1938  2 Sheets-Sheet 2
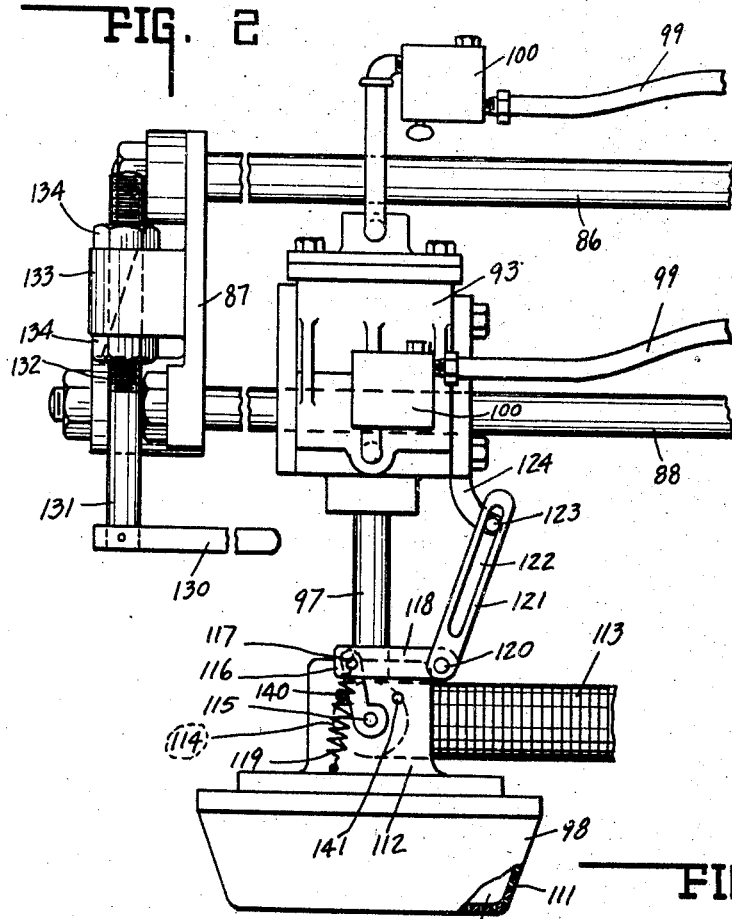
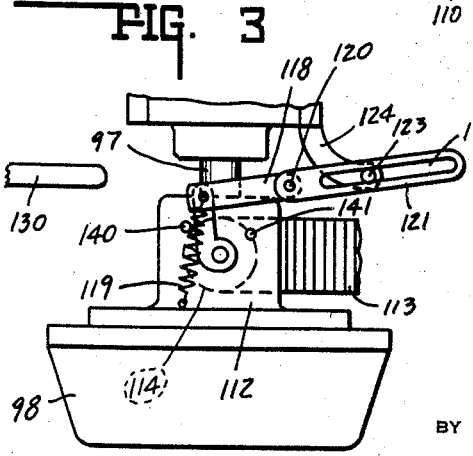
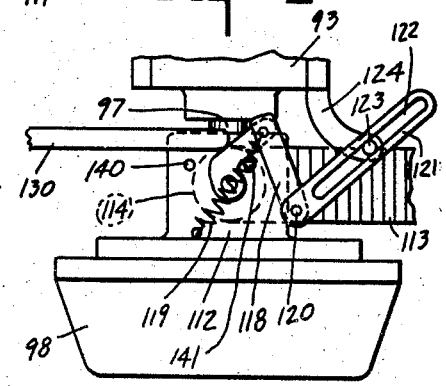
INVENTOR.
JAMES A. LEWIS.
BY
Lockwood, Goldsmith & Galt,
ATTORNEYS.

Patented Nov. 10, 1942

2,301,892

UNITED STATES PATENT OFFICE 2,301,892

GLASS MACHINE

James A. Lewis, Hartford City, Ind., assignor to Sneath Glass Company, Hartford City, Ind., a corporation Original application November 5, 1938, Serial No. 239,041. Divided and this application May 31, 1939, Serial No. 276,511

4 Claims. (Cl. 214—1)

This invention relates to apparatus and process for insuring the perfect formation of a predetermined glass article.

This invention also relates to the automatic removal of the glass article when formed and its deposition upon a support adjacent the article forming machine.

One chief object of the invention is to provide means for automatically removing the formed article of glassware while still in a plastic state and holding the article by suction until it has become set or nearly so, from the machine mold and depositing it on a suitable support adjacent the machine and from which it is subsequently removed to the lehr.

Another chief object of the invention is to keep the semi-plastic article in shape until it has finally set or nearly so.

The chief feature of the invention consists in the provision of means applied to a standard glass pressing machine for accomplishing the foregoing objects.

Other objects and features will be set forth more fully hereinafter.

This application is a division of the co-pending application Serial No. 239,041 filed November 5, 1938, and entitled "Glass machine," now Patent No. 2,251,847, dated August 5, 1941.

The full nature of the invention will be understood from the accompanying drawings and the following description and claims:

In the drawings, Fig. 1 is an elevational view of portions of a glass pressing machine with an overhanging support and glass article removing mechanism supported thereby, the full lines indicating the mechanism in the pick-up position, the dotted lines indicating the mechanism in the glass article releasing position.

Fig. 2 is an enlarged elevational view of a portion of the support, and the article pick-up and releasing mechanism supported thereby, the latter and its immediate control being shown in the article engaging position and preliminary to elevation, the article being omitted for clearness.

Fig. 3 is a similar view of the control in the eleveated and article holding position to permit main mold movement therebeneath.

Fig. 4 is a similar view of the control in the elevated and article releasing position remote from the "pick-up" station and in the deposit station.

Figure 1:
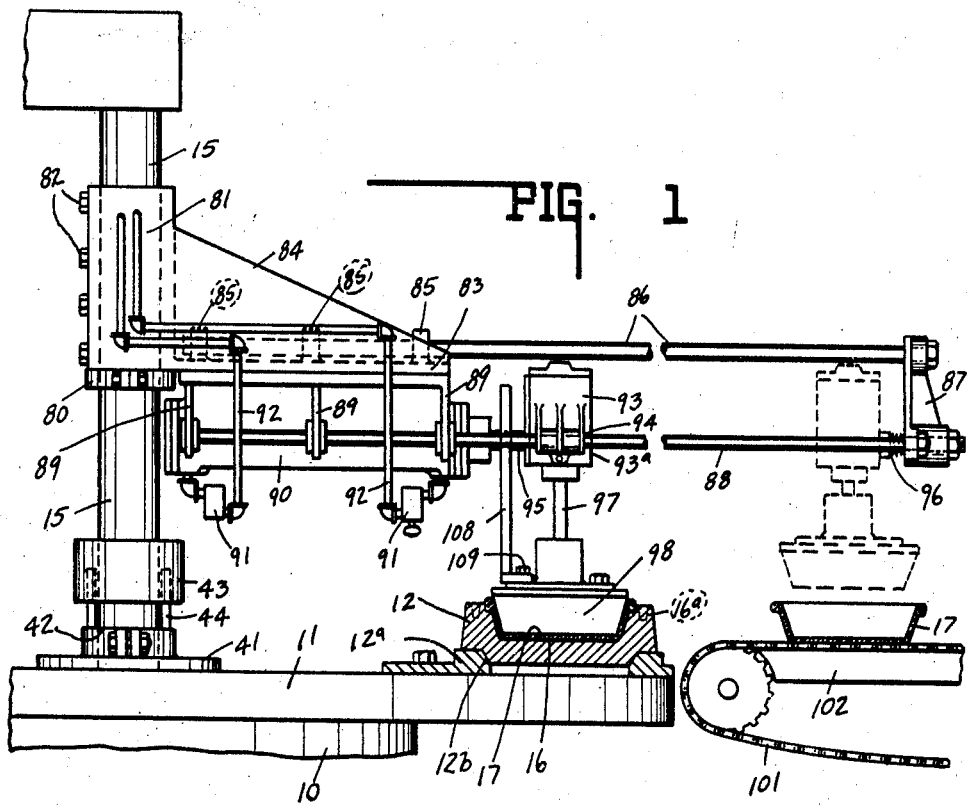

In Fig. 1 of the drawings, 10 indicates the bed of the machine, 11 indicates the rotating table, rotatably supported thereby and adapted to detachably or otherwise suitably receive or support main molds 12 of which one is shown in section in Fig. 1. Rising from the bed of the machine is a central column or standard 15 which is stationary. Parts indicated by numerals 41 to 44 inclusive in Fig. 1 are parts of the glass machine described and claimed in the aforesaid application.

As shown in Fig. 1, the main mold is provided with outwardly flared walls if desired. The main mold is nested at 12b in the well of the locating plate 12a. The mold has a chamber 16. It is, of course, to be understood that since the table is rotary there are a plurality of molds spaced equally distant and the table is rotated by any suitable means, such as a Geneva movement and the like, not shown.

The article is indicated by the numeral 17. It is formed in this mold by a pressing plunger, or the like, well known in the industry, or by the same in combination with other mechanism, as set forth in the copending application, of which this is a division. It is to be understood that this rotary table has intermittent movement.

It, of course, is to be understood that following the pressing operation, the glass is in a critical condition and it is retained in the mold until the article is removed from the mold. The elevating mechanism is such that it tends to cool the article by contact and also to retain the article in proper form until it has finally set, or nearly so. This prevents warping of the article, as will be hereinafter more fully set forth.

In Fig. 1, the numeral 80 indicates a support collar adjustably mounted and secured upon the vertical standard 15. A tubular support portion 81 is suitably supported by the collar 80 and secured, as at 82, to the support member 15. It includes the overhanging plate portion 83 which is suitably reenforced by the rib structure 84.

The plate portion is provided with a plurality of aligned bearings 85 which support the horizontal member 86 which at its free end carries a hanger portion 87 which in turn supports the free ends of spaced guide rods 88 also carried at the opposite ends by the depending arm portions 89 carried by the plate 83. The foregoing provides an elongated, cantilever, open work type overhanging support.

Plate 83 also suspendingly supports a cylinder structure 90. Each end thereof is connected by a valve member 91 and conduit 92 to a suitable source of fluid pressure. The pressure supply is regulated at a central control station not shown herein.

Slidably supported on the spaced members 88, as at 94, is a cross head 93. The cross head 93 is connected to piston rod 95 connected to a piston (not shown) within cylinder 90. As compressed air is applied to opposite ends of the cylinder, the piston therein is reciprocated, and the cross head structure can be moved from the full line position, see Fig. 1, to the dotted line position, and vice versa. The hanger 87, if desired, may be provided with a bumper structure 96 adapted to engage the face 93a of the cross head 93.

The cross head 93 is in the form of a cylinder and mounted therein is a piston (not shown) which is connected to a piston rod 97 extending downwardly and terminating in a suction head 98. Conduits 99 connect by way of valves 100 and communicate with opposite ends of the cylinder 93, see Fig. 2. At the appropriate time and at the central control station, before mentioned, fluid pressure in the form of compressed air or the like is supplied to opposite ends of the cylinder 93 for actuating the piston therein for lowering and raising the suction head 98. The lowered position is shown in full lines in Figs. 1 and 2. The elevated position is shown by the dotted lines of Fig. 1 and by full lines in Figs. 3 and 4. The amount of travel necessary between these two positions is that sufficient to remove the article 17 from the main mold 12 and have the bottom of the article clear the uppermost surface of the mold 12 so that the cross head may be moved laterally (herein radially) from the mold position to the dotted line position, see Fig. 1 and the travel must be sufficient to have head 98 clear article 17 as shown in the right hand portion of Fig. 1.

When the cross head is in this position, suction may be released from the suction head and the article deposited on a suitable support which herein is shown in the form of an endless conveyor 101, the upper flight of which is suitably supported as at 102. The ware then may be transported and discharged into a lehr. This conveyor mechanism may, if desired, be omitted and the released ware may be received on a carrier or plate immediately below the dotted line position of the suction head, as shown in Fig. 1, and the carrier boy will then carry the ware to the lehr.

If desired, when the cross head has moved to the dotted line position, see Fig. 1, the pressure supply to the cylinder 93 may be reversed from that previously set forth and the article and suction head may be lowered on to the conveyor 101, the suction released, and then the head may be elevated. In order to effect this type of operation, the cross head, however, must move in the same direction as the upper run of the conveyor and at the same linear speed from the time the article is deposited on the conveyor, the suction must be released from the suction head immediately following ware-conveyor contact and the head must be elevated to the dotted line position, as shown in Fig. 1, previous to the conveyor transporting the article beyond the position of the same as shown at the right in Fig. 1, otherwise the ware would contact and not clear the rising suction head, thus resulting in damaged ware.

Since in Fig. 1 members 86 and 88 are broken away, it is to be understood that the receiving end of the conveyor indicated by 101 actually is positioned remote from the forming machine at the transfer and take-out station thereof. However, such receiving end is immediately adjacent the remote end of the transfer structure represented by the end member 87 and those portions of members 86 and 88 immediately contiguous thereto as shown in Fig. 1. The fact that in Fig. 1 table 11 and conveyor 101 are shown immediately contiguous, is not to be construed that such close proximity actually exists, for such is not the case, as noted above.

This operation is, of course, all determined by suitable timing mechanisms some of which are at the central control station. In machines of this general type, there is one main cam shaft or control shaft operable in timed relation with the rotation of the table 11 so that the predetermined cycles of operation for the various devices are obtained through this control.

For a better understanding of the suction head mechanism and its action reference will be had to Figs. 1 to 4. In Fig. 1 the suction head 98 has secured to it at 109 a pair of uprights 108 which straddle piston rod 95 and thus prevent the suction head 98 from turning relative to cross head 93 and the axis of rod 97. Thus suction head 98 will always be properly aligned for registration with mold 12 and article 17 at station E.

The suction head 98 includes a chamber 110, see Fig. 2, provided with a suitable number of apertures 111. This chamber 110 communicates with the tubular portion 112 to which there is connected a flexible conduit 113 connected to a source of partial vacuum. A valve 114 controls the application of vacuum to the chamber 110. The valve 114 includes a shaft 115 which externally mounts an actuating L-shaped arm 116 in turn having a pin 117 by which there is pivotally mounted the link member 118. A spring 119 normally constrains the member 118 to the predetermined control position corresponding to the application of vacuum. The spring 119 is so secured to the suction head that it operates like a toggle switch to bias lever 116 past the "dead center" position, in which the lever and links 118 and 121 are in alignment.

Link 118 is pivotally connected at its opposite end at 120 to the lower end of the link arm 121 having an elongated slot 122 therein. In this slot is a pin 123 carried by the depending arm portion 124, carried by the cross head 93. As the suction head 98 is lowered with reference to the cylinder 93, the valve 114 remains in its cut-off position condition until such time as the upper end of the slot 122 engages the pin 123 whereupon continued movement actuates the member 118 to actuate the valve arm 115 to open the valve and apply suction to chamber 110. Arm 115 engages stop pin 140 and spring 119 holds the arm over-center in the valve open position.

Valve closing mechanism includes a laterally projecting arm 130 carried by member 131 which is threaded as at 132 and the same is slidably mounted in the boss 133 carried by member 87 and locked in the adjusted position by nuts 134, see Fig. 2.

The full line shown in Fig. 1 and Fig. 2 of the suction head illustrates same in the "pick-up" position. Following engagement and removal of the article 17 from mold 12 by elevating head 98, the valve 114 remains in suction applying position. This position is illustrated in Figs. 2 and 3. Links 118 and 121, however, assume different relative positions.

In Fig. 2 members 86 and 87 are again broken away but in this figure same occurs immediately adjacent end member 87. The fact that member 130 is similarly broken away is not to be construed as meaning that the amount of break-out in these two instances is the same for it is not. The pick-up or take-out device in Fig. 2 actually is illustrated in lowered position with vacuum applied to remove an article from the mold. Fig. 3 illustrates the take-out device elevated and in vacuum applying position prior to vacuum release. Fig. 4 shows the release position, release being effected by pick-up device travel and engagement with member 130.

When head 98 with article 17 held thereto by suction has sufficiently elevated to clear mold 12, the cross head 93 moves toward the discharge station, see dotted lines in Fig. 1. Near the end of such movement, see Fig. 3, the arm 130 is engaged, see Fig. 4, by arm 116 and forced over-center and to the right, as shown in Fig. 4. This over-center movement is limited by stop pin 141. The suction is now cut-off by valve 114.

If the cross-head 93 is not to travel to any appreciable extent on rods 88, the arm 130 will terminate close to the pick-up station for suction cut-off. If cross head travel is extensive, as before described, the cut-off occurs, as illustrated. Suction, in either event, remains off until the suction head has lowered sufficiently for arm 115 to be moved from the position shown in Fig. 4 to the position shown in Figs. 2 and 3.

In addition to the foregoing operation description, it is to be observed that link 118 is pivotally mounted to arm 116 at 117. As the suction head 98 is lowered there is a position where all links and arm 116 are in alignment. Then as movement continues pin 123 in top of slot 122 pulls up on all so that arm 116 slightly turns counter-clockwise and when that happens the alignment is broken and the parts "flip" overcenter and to the position shown in Fig. 2, because spring 119 now constrains the arm 116 to the position shown in Figs. 1 and 3 whereas before it constrained arm 116 to the position shown in Fig. 4, the highest position of head 98.

In addition to the obvious advantages of an automatic transfer device for pressed glassware, it is to be observed that if the hot glass, after pressing, is left too long in the mold 12 the glassware warps. If it is taken out of the mold when it is in too hot a condition then the glassware will crumple or run out of shape. This warpage is due to the fact that the glassware will chill externally and in so doing invariably twists out of shape and for tray structures will not be as flat as it should be. With the suction type transfer head, the article is elevated from the mold at the proper time and is held for the proper time until the article has cooled off outside of its mold. With the present device, when the article is taken from the mold, it is in a semi-plastic condition and the suction head holds the device from the inside and thus the tray or article being hotter on the inside than on the outside will again to a certain extent re-heat throughout, or rather endeavor to obtain a uniform temperature throughout, so that previous to taking its final set the article invariably straightens out and sets straight instead of crooked or warped.

During this suction head holding operation, as stated, the article is held to the suction head so that it will take the shape of the suction head and due to the fact that the exterior of the article has taken an initial set, the final set will be true and straight. This contact with the suction head facilitates or assists in rapidly cooling the interior of the article. While the invention has been illustrated and described in great detail in the drawings and foregoing description, the same is to be considered as illustrative and not restrictive in character.

The several modifications which will readily suggest themselves to persons skilled in this art, all are considered to be within the broad scope of the invention, reference being had to the appended claims.

The invention claimed is:

1. An article remover control mechanism including a suction head for suction attachment to an article, a valve controlling the application of suction to said head, an operating arm for said valve, a pair of links pivotally connected together at adjacent ends, one link being pivotally connected at the other end to the arm, spring means operatively associated with the arm and constraining the valve to apply suction to the head, and means for actuating the arm in the bodily movement of said means, the arm and head, said means having a lost motion connection with the other end of the other of the pivotally connected links.

2. An article remover control mechanism including a suction head for suction attachment to an article, a valve controlling the application of suction to said head, an operating arm for said valve, a pair of links pivotally connected together at adjacent ends, one link being pivotally connected at the other end to the arm, spring means operatively associated with the arm and constraining the valve to apply suction to the head, means for actuating the arm in the bodily movement of said means, the arm and head, said means having a lost motion connection with the other end of the other of the pivotally connected links, and stop means for limiting arm movement in the suction applying and in the suction cut-off directions.

3. An article remover control mechanism including a suction head for suction attachment to an article, a valve controlling the application of suction to said head, an operating arm for said valve, a pair of links pivotally connected together at adjacent ends, one link being pivotally connected at the other end to the arm, spring means operatively associated with the arm and constraining the valve to apply suction to the head, and means for actuating the arm in the bodily movement of said means, the arm and head, said means having a lost motion connection with the other end of the other of the pivotally connected links, the lost motion connection between the arm actuating means and the said other link being of pin and elongated slot connection type.

4. An article remover control mechanism including a suction head for suction attachment to an article, a valve controlling the application of suction to said head, an operating arm for said valve, a pair of links pivotally connected together at adjacent ends, one link being pivotally connected at the other end to the arm spring means operatively associated with the arm and constraining the valve to apply suction to the head, and means for actuating the arm in the bodily movement of said means, the arm and head, said means having a lost motion connection with the other end of the other of the pivotally connected links, the lost motion connection between the arm actuating means and the said other link being of pin and elongated slot connection type, the slot being in said other link and extending longitudinally thereof, and the pin being offset laterally from the pivotal axis of said arm, the pin and arm having relative movement toward and away from each other.

JAMES A. LEWIS.